United States Patent Office.

GEORGE T. THORP, OF PHILADELPHIA, PENNSYLVANIA.

Letters Patent No. 96,288, dated October 26, 1869.

---

IMPROVED FISH-BAIT.

---

The Schedule referred to in these Letters Patent and making part of the same.

---

*To all whom it may concern:*

Be it known that I, GEORGE T. THORP, of the city and county of Philadelphia, and State of Pennsylvania, have invented a new and useful "Fish-Bait," to be used in bow or fyke-nets; and I do hereby declare the following is a full, clear, and exact description thereof.

The nature of my invention consists in preparing a cake of a certain mixture of various kinds of grain, which is to be used as a fish-bait in bow or fyke-nets.

To enable others to make and use my invention, I will proceed to describe its composition, and the manner in which it is made.

I take about equal parts of wheat, oats, rye, and corn, coarse-ground or cracked, mix the same into dough with water, roll it out about one-quarter or three-eighths of an inch thick, and cut it with a round cutter into cakes about four inches in diameter. It is then baked in a medium oven.

The corn-meal may be omitted, without much detriment to the efficacy of the bait.

The fish-bait thus made holds well together, until nibbled off by the fish, and will keep sweet for at least forty-eight hours.

One or more of these cakes (four being about the usual number) are placed as a bait inside a bow/or fyke-net. It is very attractive to the fish, and by it a much larger quantity may be caught than by any other known bait.

What I claim as my invention, and desire to secure by Letters Patent, is—

The fish-bait made of one or more of the within-mentioned ingredients, and used substantially in the manner herein described.

GEORGE T. THORP.

Witnesses:
 EDWD. BROWN,
 JOSEPH RABY.